United States Patent [19]
Wood et al.

[11] 4,062,130
[45] Dec. 13, 1977

[54] MECHANISM MODELING

[76] Inventors: George A. Wood, Giles Road, R.F.D 1, Lincoln, Mass. 01773; Louis E. Torfason, 147 Claremount Drive, Fredericton, New Brunswick, Canada, E3A1E7

[21] Appl. No.: 703,672

[22] Filed: July 8, 1976

[51] Int. Cl.² .............................................. G09B 25/02
[52] U.S. Cl. ........................................ 35/13; 33/1 AA
[58] Field of Search ................... 35/13; 46/11, 16, 17, 46/29; 29/235, 243.5, 243.52; 72/317; 33/1 AA

[56] References Cited
U.S. PATENT DOCUMENTS

| | | | |
|---|---|---|---|
| 242,391 | 5/1881 | Stephens | 29/243.52 |
| 1,860,627 | 5/1932 | Sherman | 46/29 |
| 2,347,561 | 4/1944 | Howard et al. | 46/17 X |
| 2,425,031 | 8/1947 | De Wald | 29/243.5 |
| 2,712,711 | 7/1955 | Leyden | 46/11 X |
| 2,722,060 | 11/1955 | Flower et al. | 35/13 |
| 2,885,793 | 5/1959 | Oback et al. | 35/13 |
| 3,679,809 | 7/1972 | Wertman | 35/13 |
| 3,824,692 | 7/1974 | Guffey et al. | 35/13 X |

Primary Examiner—William H. Grieb

[57] ABSTRACT

Mechanism modeling kit in which flat simulations of machine elements may be assembled into demonstration working units, some elements being pivotable relative to others on loosely tightened grommets.

3 Claims, 12 Drawing Figures

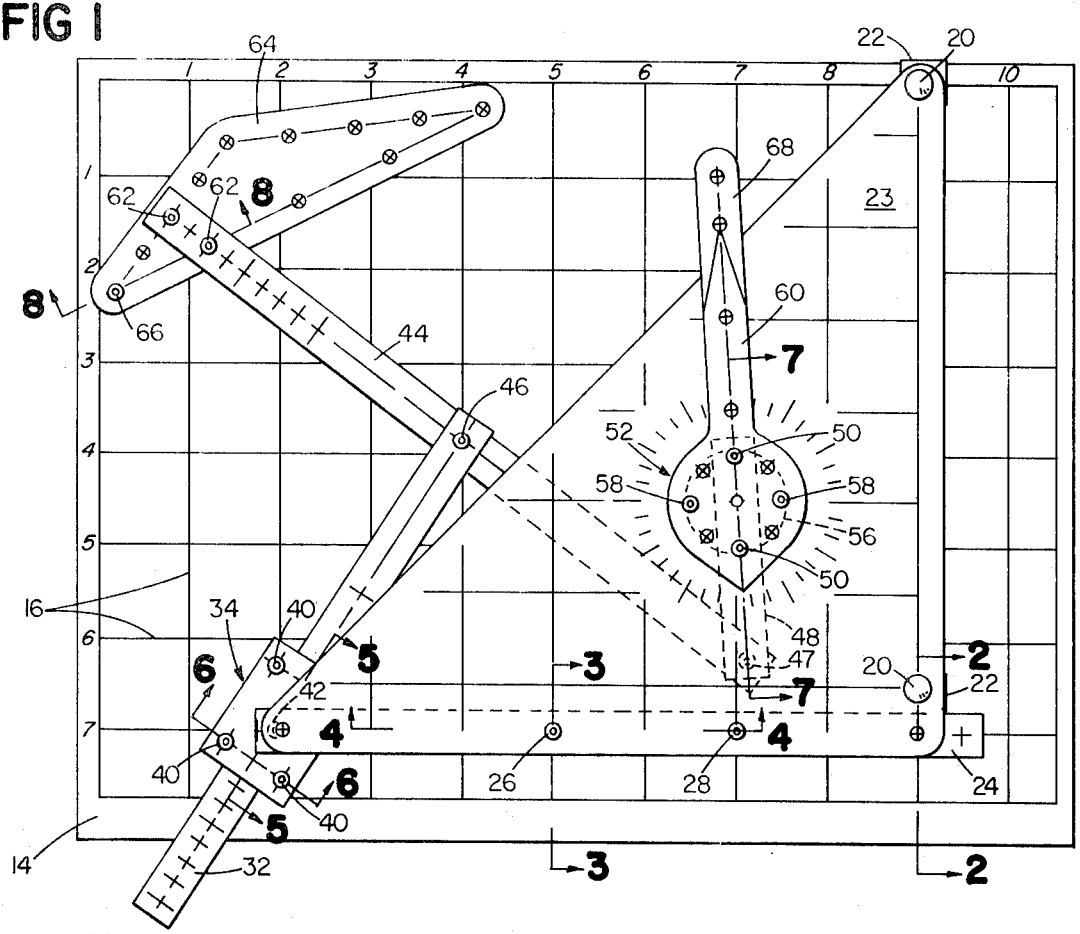

MECHANISM MODELING

This invention relates to modeling mechanisms, particularly machine linkages.

BACKGROUND OF THE INVENTION

It has long been known to make models of mechanisms including linkages. Cardboard elements have been cut out and assembled for the purpose, to at least some extent.

SUMMARY OF THE INVENTION

The invention features a kit, and kit elements, that make possible mechanism modeling, in essentially two dimensions, with novel efficiency and effectiveness.

In one aspect, the invention features providing in cardboard sheets almost-completely precut punchout simulated machine elements, including in preferred embodiments slotted and unslotted straight links, triangular link shapes, sliding joint bearing part elements, crank spacers, cranks, backup disks, base sheets, and crank supports. In a second aspect, it provides revolute joints (both stationary and moving) and other joints through appropriately untight or tight grommets. In a third aspect, it provides a tool well adapted to secure grommets in predetermined position, to predetermined tightness.

The kit not only permits inexpensive and easy modeling to test and optimize machines before building them, but provides a valuable tool for teachers and students. Further, solutions may be easily placed in notebooks or files for storage.

PREFERRED EMBODIMENT

Let us turn now to the presently preferred embodiment of the invention.

DRAWINGS

FIG. 1 is a plan view of a mechanism according to, and made up according to the preferred embodiment of the invention.

FIG. 2 is a partial sectional view, taken at 2—2 of FIG. 1.

FIG. 3 is a partial sectional view, at 3—3 of FIG. 1.

FIG. 4 is a partial sectional view, taken at 4—4 of FIG. 1.

FIG. 5 is a partial sectional view, taken at 5—5 of FIG. 1.

FIG. 6 is a partial sectional view, taken at 6—6 of FIG. 1.

FIG. 7 is a partial sectional view at 7—7 of FIG. 1.

FIG. 8 is a partial sectional view at 8—8 of FIG. 1.

FIG. 9 is a partial plan view of one punchout cardboard sheet of the kit of said preferred embodiment.

DESCRIPTION

Figure 10:
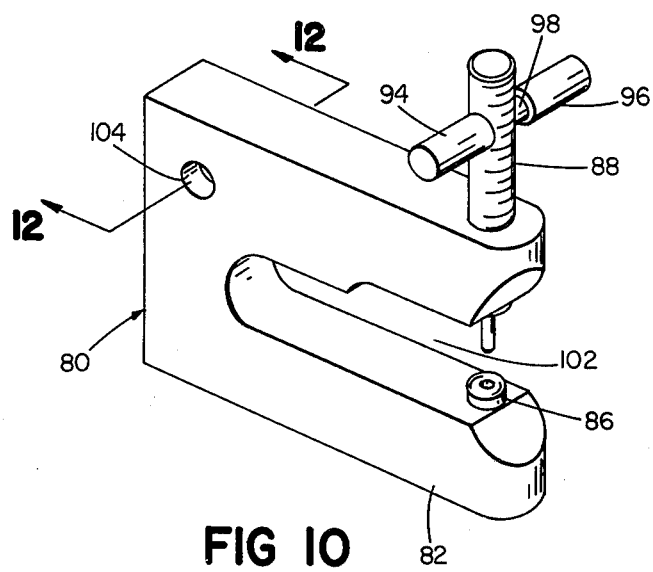
FIG. 10 is a perspective view of the preferred grommettightening tool according to the invention.

In FIG. 1 is shown a working model, essentially in two dimensions, of a "D" curve optimizer for parts indexing in machinery. The unit is shown secured to the working base (indicated generally at 10, and with printed light cardboard face 14, imprinted with grid 16, over corrugated cardboard layer 18) by means of two thumbtacks 20, extending each through a six-times folded link element 22 to space triangular crank support 23 away from base 10.

Slide 24, longitudinally axially slotted between and somewhat beyond on each side of grommets 26 and 28, is secured against downward movement by stationary link 30.

Another slide 32 is slidably mounted in the tunnel slider joint indicated generally at 34, and constituting parts 36 and 38, each bent over along its longitudinal edge to provide a four-layer thickness where grommets 40 pass through, providing intermediately both room for the lower head of grommet 42, rotatably securing slide 24 to upper tunnel slide housing member 36, and for slidable movement of slide 32.

Slide 32 is rotatably secured to link 44 by grommet 46. Link 44 is mounted at its lower end in a moving revolute joint on grommet 47 with link 48, which is secured by grommets 50 to the crank assembly indicated generally at 52, and including backup "disk" 54, crank spacer 56 (rotatably mounted in a large hole in crank support 23), and crank 60. Grommets 50 and 58 extend through crank 60, spacer 56, backup element 54, and link 48.

At its other end, link 44 is secured by grommets 62 to triangular coupler link 64, which has through it a grommet 66.

If a writing point W is placed through the hole in grommet 66 and the handle 68 of crank 60 is turned, the latter moves link 48 to move link 44 and slide 46 and link 64, describing a "D" curve. If slide 24 is moved and crank 60 again rotated, another "D" curve is generated at grommet 66.

A portion of a kit sheet is shown in FIG. 9. Elements are almost cut through, on lines 70, to permit easy punching out. Shown on sheet 72 are triangular coupler links 74 and 76, tunnel slide element 36, crank spacer elements 56, crank 60, and crank backup disk 54.

Figure 12:
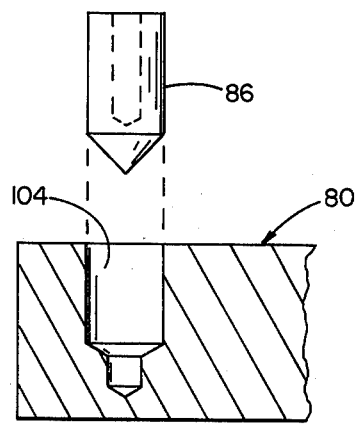
FIG. 12 is a partial sectional view at 12—12 of FIG. 10, but showing the anvil moved to a new position.
Figure 11:
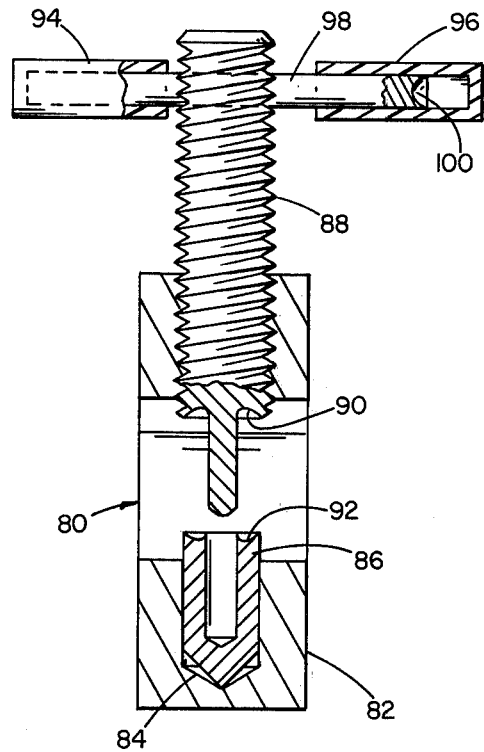
FIG. 11 is a transverse vertical sectional view through said tool.

A novel tool particularly adapted to apply grommets in the invention is shown in FIGS. 10-12. Frame 80 has base 82 with blind hole 84 (included angle at bottom 120°) carrying therein rotatably mounted anvil 86, its tip conical with the lower included angle of 90° for low rotational friction. Crimping element 88 may be threadedly brought down to crimp a grommet between its surface 90 and anvil surface 92; control is great, so that crimping may be light, to allow free rotatability around the grommet, or tight, so that there is no free relative movement.

Plastic caps 94 and 96 are provided on handle 98; cap 96 is removable to expose cardboard punch 100.

If a grommet is needed so far from an edge that opening 102 is not enough, anvil 86 can be placed in hole 104, and element 88 removed and used with a hammer to tighten down the grommet.

The kit may also include small nuts and bolts to hold various elements together, and nylon washers.

CONCLUSION

Other embodiments of the invention will occur to those skilled in the art.

What is claimed is:

1. A mechanism modeling kit in which flat non-metallic simulations of machine elements may be assembled into demonstration working elements for designing machinery and teaching the design thereof comprising at least one sheet, said sheet being pre-cut to provide punchable machine elements and links of different sizes and shapes, hollow grommets for heading in assembly of said elements and links, a grommet heading tool for tighteningly heading said grommets, wherein said grommets are loosely headed around at least one element and one link for pivotal movement thereof, said tool including a frame, an anvil and a crimping element supported by said frame, said crimping element being rotatably mounted in said frame for controllable crimping movement toward said anvil.

2. The kit of claim 1 in which said anvil has a longitudinally extending external cylindrical portion and a conical tip and said frame includes a blind cylindrical hole in which said external cylindrical portion is rotatably mounted, said hole terminating in a surface the included angle of which being greater than the included angle of said conical tip.

3. The kit of claim 1 in which said frame includes a base, said base having in its side a second hole for accepting said anvil.

* * * * *